(12) United States Patent
Lin et al.

(10) Patent No.: US 10,161,021 B2
(45) Date of Patent: Dec. 25, 2018

(54) FCC MATERIALS OF ALUMINUM, COBALT AND NICKEL, AND PRODUCTS MADE THEREFROM

(71) Applicant: ARCONIC INC., Pittsburgh, PA (US)

(72) Inventors: Jen Lin, Export, PA (US); Xinyan Yan, Murrysville, PA (US)

(73) Assignee: ARCONIC INC., Pittsburgh, PA (US)

(*) Notice: Subject to any disclaimer, the term of this patent is extended or adjusted under 35 U.S.C. 154(b) by 0 days.

(21) Appl. No.: 15/493,026

(22) Filed: Apr. 20, 2017

(65) Prior Publication Data
US 2017/0306459 A1 Oct. 26, 2017

Related U.S. Application Data

(60) Provisional application No. 62/325,053, filed on Apr. 20, 2016.

(51) Int. Cl.
| | | |
|---|---|---|
| C22F 1/10 | (2006.01) | |
| C22C 30/00 | (2006.01) | |
| B33Y 10/00 | (2015.01) | |
| B33Y 70/00 | (2015.01) | |
| B22F 1/00 | (2006.01) | |
| B22F 3/15 | (2006.01) | |
| B22F 3/17 | (2006.01) | |
| B22F 3/18 | (2006.01) | |
| B22F 3/20 | (2006.01) | |
| B23K 10/02 | (2006.01) | |
| B23K 15/00 | (2006.01) | |
| B23K 35/02 | (2006.01) | |
| B23K 35/30 | (2006.01) | |
| C22C 19/03 | (2006.01) | |
| C22F 1/00 | (2006.01) | |
| B22F 3/105 | (2006.01) | |
| B22F 7/06 | (2006.01) | |
| B23K 26/00 | (2014.01) | |
| B23K 26/342 | (2014.01) | |
| B23K 103/08 | (2006.01) | |
| B23K 103/18 | (2006.01) | |

(52) U.S. Cl.
CPC ............ *C22C 30/00* (2013.01); *B22F 1/0003* (2013.01); *B22F 3/1055* (2013.01); *B22F 3/15* (2013.01); *B22F 3/17* (2013.01); *B22F 3/18* (2013.01); *B22F 3/20* (2013.01); *B22F 7/06* (2013.01); *B23K 10/027* (2013.01); *B23K 15/0086* (2013.01); *B23K 15/0093* (2013.01); *B23K 26/0006* (2013.01); *B23K 26/342* (2015.10); *B23K 35/0261* (2013.01); *B23K 35/3033* (2013.01); *B33Y 10/00* (2014.12); *B33Y 70/00* (2014.12); *C22C 19/03* (2013.01); *C22F 1/002* (2013.01); *C22F 1/10* (2013.01); *B22F 2301/15* (2013.01); *B22F 2998/10* (2013.01); *B23K 2103/08* (2018.08); *B23K 2103/26* (2018.08)

(58) Field of Classification Search
CPC .. B33Y 70/00; B23K 15/0086; B23K 10/027; B22F 3/20; B22F 3/18; B22F 3/17; B22F 3/15; B22F 1/003
See application file for complete search history.

(56) References Cited

U.S. PATENT DOCUMENTS

| | | |
|---|---|---|
| 2001/0036562 A1 | 11/2001 | Sellmyer et al. |
| 2002/0044882 A1 | 4/2002 | Fahrmann et al. |
| 2002/0159914 A1 | 10/2002 | Yeh |
| 2003/0010411 A1 | 1/2003 | Mitlin et al. |
| 2003/0108721 A1 | 6/2003 | Fullerton et al. |
| 2003/0118448 A1 | 6/2003 | Lee et al. |
| 2004/0071923 A1 | 4/2004 | Fullerton et al. |
| 2004/0094246 A1 | 5/2004 | Kelly |
| 2004/0115085 A1 | 6/2004 | Steibel et al. |
| 2004/0118246 A1 | 6/2004 | Woodfield et al. |
| 2004/0141869 A1 | 7/2004 | Ott et al. |
| 2004/0146640 A1 | 7/2004 | Ott et al. |
| 2004/0241032 A1 | 12/2004 | Lopetegui et al. |
| 2005/0195533 A1 | 9/2005 | Carey et al. |
| 2005/0207070 A1 | 9/2005 | Carey et al. |
| 2005/0207073 A1 | 9/2005 | Carey et al. |
| 2005/0263261 A1 | 12/2005 | Moore et al. |
| 2005/0274439 A1 | 12/2005 | Gschneider, Jr. et al. |

(Continued)

FOREIGN PATENT DOCUMENTS

| | | |
|---|---|---|
| CN | 103173674 A | 6/2013 |
| CN | 103602872 A | 2/2014 |

(Continued)

OTHER PUBLICATIONS

International Search Report and Written Opinion, dated Jul. 11, 2017, from corresponding, co-owned International Patent Application No. PCT/US2017/028441.

(Continued)

*Primary Examiner* — Jessee R Roe
(74) *Attorney, Agent, or Firm* — Greenberg Traurig, LLP

(57) ABSTRACT

The present disclosure relates to new materials comprising Al, Co, and Ni. The new materials may realize a single phase field of a face-centered cubic (fcc) solid solution structure immediately below the solidus temperature of the material. The new materials may include at least one precipitate phase and have a solvus temperature of at least 1000° C. The new materials may include 6.7-11.4 wt. % Al, 5.0-48.0 wt. % Co, and 43.9-88.3 wt. % Ni. In one embodiment, the precipitate is selected from the group consisting of the $L1_2$ phase, the B2 phase, and combinations thereof. The new alloys may realize improved high temperature properties.

15 Claims, 4 Drawing Sheets

(56) References Cited

U.S. PATENT DOCUMENTS

| | | |
|---|---|---|
| 2006/0002026 A1 | 1/2006 | Stipe et al. |
| 2006/0065332 A1 | 3/2006 | Ienaga et al. |
| 2006/0139816 A1 | 6/2006 | Carey et al. |
| 2006/0172142 A1 | 8/2006 | Olson et al. |
| 2006/0221509 A1 | 10/2006 | Carey et al. |
| 2006/0225535 A1 | 10/2006 | Mainwaring |
| 2007/0238001 A1 | 10/2007 | Koyama |
| 2008/0003354 A1 | 1/2008 | Nolan |
| 2008/0031769 A1 | 2/2008 | Yeh |
| 2008/0100964 A1 | 5/2008 | Fullerton et al. |
| 2008/0121315 A1 | 5/2008 | Gigliotti et al. |
| 2008/0150663 A1 | 6/2008 | Yeh et al. |
| 2008/0234536 A1 | 9/2008 | Gross |
| 2008/0288042 A1 | 11/2008 | Purdy et al. |
| 2009/0074604 A1 | 3/2009 | Chen et al. |
| 2009/0081073 A1 | 3/2009 | Barbosa et al. |
| 2009/0081074 A1 | 3/2009 | Barbosa et al. |
| 2009/0092858 A1 | 4/2009 | Chen et al. |
| 2009/0263595 A1 | 10/2009 | Ellrich et al. |
| 2009/0298683 A1 | 12/2009 | Lomello-Tafin et al. |
| 2009/0301610 A1 | 12/2009 | Gillon et al. |
| 2010/0044110 A1 | 2/2010 | Bangru et al. |
| 2010/0132408 A1 | 6/2010 | Billieres |
| 2010/0132409 A1 | 6/2010 | Billieres |
| 2010/0206553 A1 | 8/2010 | Bailey et al. |
| 2011/0042069 A1 | 2/2011 | Bailey et al. |
| 2011/0143167 A1 | 6/2011 | Nolan |
| 2011/0162751 A1 | 7/2011 | Fitzgerald et al. |
| 2011/0203791 A1 | 8/2011 | Jin et al. |
| 2011/0220348 A1 | 9/2011 | Jin et al. |
| 2011/0220415 A1 | 9/2011 | Jin et al. |
| 2011/0268989 A1 | 11/2011 | Suzuki et al. |
| 2012/0070333 A1 | 3/2012 | Chen |
| 2012/0147718 A1 | 6/2012 | Hellwig et al. |
| 2012/0183708 A1 | 7/2012 | Minisandram et al. |
| 2012/0214021 A1 | 8/2012 | Sayama et al. |
| 2012/0248070 A1 | 10/2012 | Chei et al. |
| 2012/0251842 A1 | 10/2012 | Yuan et al. |
| 2013/0006149 A1 | 1/2013 | Purtzer |
| 2013/0084387 A1 | 4/2013 | Hellwig et al. |
| 2013/0108502 A1 | 5/2013 | Bei |
| 2013/0150230 A1 | 6/2013 | Taylor et al. |
| 2013/0210618 A1 | 8/2013 | Mitlin et al. |
| 2013/0323116 A1 | 12/2013 | Chen |
| 2014/0053956 A1 | 2/2014 | Etter et al. |
| 2014/0200555 A1 | 7/2014 | Simpson et al. |
| 2014/0210581 A1 | 7/2014 | Lewis et al. |
| 2014/0247477 A1 | 9/2014 | Duan et al. |
| 2014/0249620 A1 | 9/2014 | Carman et al. |
| 2014/0260478 A1 | 9/2014 | Forbes Jones et al. |
| 2014/0271337 A1 | 9/2014 | Waeckerle et al. |
| 2014/0283953 A1 | 9/2014 | Waeckerle et al. |
| 2014/0290321 A1 | 10/2014 | Minisandram et al. |
| 2014/0292152 A1 | 10/2014 | Garnmel et al. |
| 2014/0299233 A1 | 10/2014 | Waeckerle et al. |
| 2015/0050541 A1 | 2/2015 | Kinoshita et al. |
| 2015/0096900 A1 | 4/2015 | Schulz et al. |
| 2015/0265299 A1 | 9/2015 | Cooper et al. |
| 2015/0362473 A1 | 12/2015 | Anapolsky |

FOREIGN PATENT DOCUMENTS

| | | |
|---|---|---|
| CN | 104946912 A | 9/2015 |
| JP | S58-153750 | 9/1983 |
| TW | M334129 U | 6/2008 |

OTHER PUBLICATIONS

Chen, Weiping, et al., "Processing, microstructure and properties of $Al_{0.6}CoNiFeTi_{0.4}$ high entropy alloy with nanoscale twins", *Materials Science & Engineering A* 565, pp. 439-444 (2013).

Frazier, William E., "Metal additive manufacturing: a review", *Journal of Materials Engineering and Perjormance* 23(6):1917-1928 (2014).

Fu, Zhiqiang, et al., "Effect of Cr addition on the alloying behavior, microstructure and mechanical properties of twinned $CoFeNiAl_{0.5}Ti_{0.5}$ alloy", *Materials Science & Engineering A* 597, pp. 204-211 (2014).

Fu, Zhiqiang, et al,, "Influence of Ti addition and sintering method on microstructure and mechanical behavior of a medium-entropy $Al_{0.6}CoNiFe$ alloy", *Materials Science & Engineering A* 619, pp. 137-145 (2014).

Fu, Zhiqiang, et al., "Microstructure and mechanical behavior of a novel $Co_{20}Ni_{20}Fe_{20}Al_{20}Ti_{20}$ alloy fabricated by mechanical alloying and spark plasma sintering", *Materials Science & Engineering A* 644, pp. 10-16 (2015).

Poletti, M.G., et , "Electronic and thermodynamic criteria for the occurrence of high entropy alloys in metallic systems" *Acta Materialia* 75, pp. 297-306 (2014).

Qi, Tianlong, et al., "Soft magnetic $Fe_{25}Co_{25}Ni_{25}$ (B, $Si)_{25}$ high entropy bulk metallic glasses", *Intermetallics* 66, pp. 8-12 (2015).

Singh, Anil Kumar, et al., "A geometrical parameter for the formation of disordered solid solutions in multi-component alloys" *Intermetallics* 53, pp. 112-119 (2014).

Zuo, T. T., et al., "Effects of Al and Si addition on the structure and properties of CoFeNi equal atomic ratio alloy", *Journal of Magnetism and Magnetic Materials* 371, pp. 60-68, (2014).

"Novel High-Entropy Alloys for High Temperature Applications", US Dept. of Energy, National Energy Technology Laboratory, 2 pages, May 2015.

FCC MATERIALS OF ALUMINUM, COBALT AND NICKEL, AND PRODUCTS MADE THEREFROM

CROSS-REFERENCE TO RELATED APPLICATION

This patent application is a continuation of International Patent Application No. PCT/US2017/028441, filed Apr. 19, 2017, and claims benefit of priority of U.S. Provisional Patent Application No. 62/325,053, filed Apr. 20, 2016, both entitled "FCC MATERIALS OF ALUMINUM, COBALT AND NICKEL, AND PRODUCTS MADE THEREFROM", each of which is incorporated herein by reference in its entirety.

BACKGROUND

INCONEL 625 is a nickel-based alloy having a nominal composition of 61 wt. % Ni, 21.5 wt. % Cr, 9 wt. % Mo, and 3.6 wt. % of (Nb+Ta). INCONEL 625 has high strength and toughness from cryogenic temperatures to 980° C., good oxidation resistance, fatigue strength, and corrosion resistance.

SUMMARY OF THE DISCLOSURE

Broadly, the present patent application relates to new aluminum-cobalt-nickel materials ("the new materials") having a single phase field of a face-centered cubic (fcc) solid solution structure immediately below the solidus temperature of the material. The new materials may include at least one precipitate phase and have a solvus temperature of at least 1000° C. The solvus temperature is an indication of a material's strength and thermal stability at elevated temperatures. Generally, the higher the solvus temperature, the higher the strength and thermal stability at elevated temperatures. The new materials may include 6.7-11.4 wt. % Al, 5.0-48.0 wt. % Co, and 43.9-88.3 wt. % Ni. In one embodiment, the precipitate is selected from the group consisting of the $L1_2$ phase, the B2 phase, and combinations thereof. The precipitation phase(s) may be formed through a solid state transformation process. In one specific approach, the new materials may include 7.4-10.3 wt. % Al, 5.6-43.6 wt. % Co, and 48.8-84.1 wt. % Ni, allowing for optional incidental elements and unavoidable impurities. Other aspects, approaches, and embodiments relating to the new materials are described in detail below.

DETAILED DESCRIPTION

Figure 1:
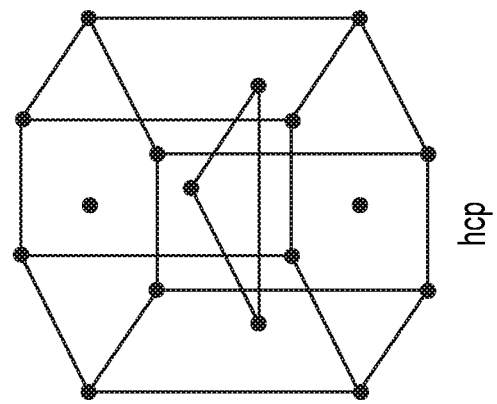
FIG. 1 is a schematic illustration of bcc, fcc, and hcp unit cells.
Figure 1:
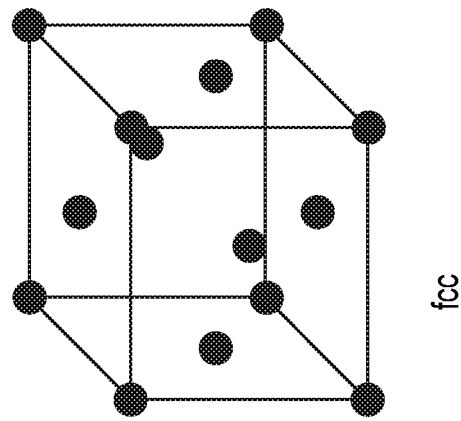
Figure 1:
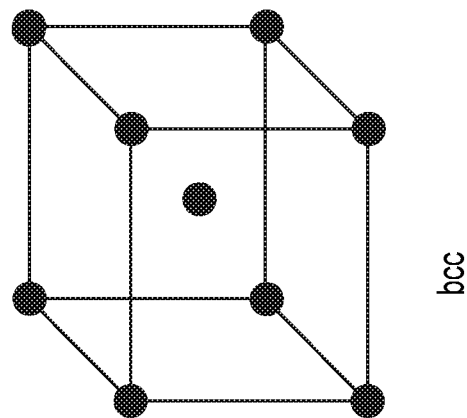

As noted above, the present patent application relates to new aluminum-cobalt-nickel materials ("the new materials") having a single phase field of a face-centered cubic (fcc) solid solution structure immediately below the solidus temperature of the material. As known to those skilled in the art, and as shown in FIG. 1, a face-centered cubic (fcc) unit cell has atoms at each of the eight corners of a cube plus one atom on each face of the cube. Each of the corner atoms is the corner of another cube so the corner atoms are shared among eight unit cells, while the face atoms are shared with two unit cells.

Due to the unique compositions described herein, the new materials may realize a single phase field of a fcc solid solution structure immediately below the solidus temperature of the material. The new materials may also have a high liquidus temperature and a narrow equilibrium freezing range (e.g., for restricting microsegregation during solidification), making them suitable for production through conventional ingot processing, as well as powder metallurgy, shape casting, additive manufacturing, and combinations thereof (hybrid processing). The new materials may find use in high temperature applications.

Figure 2:
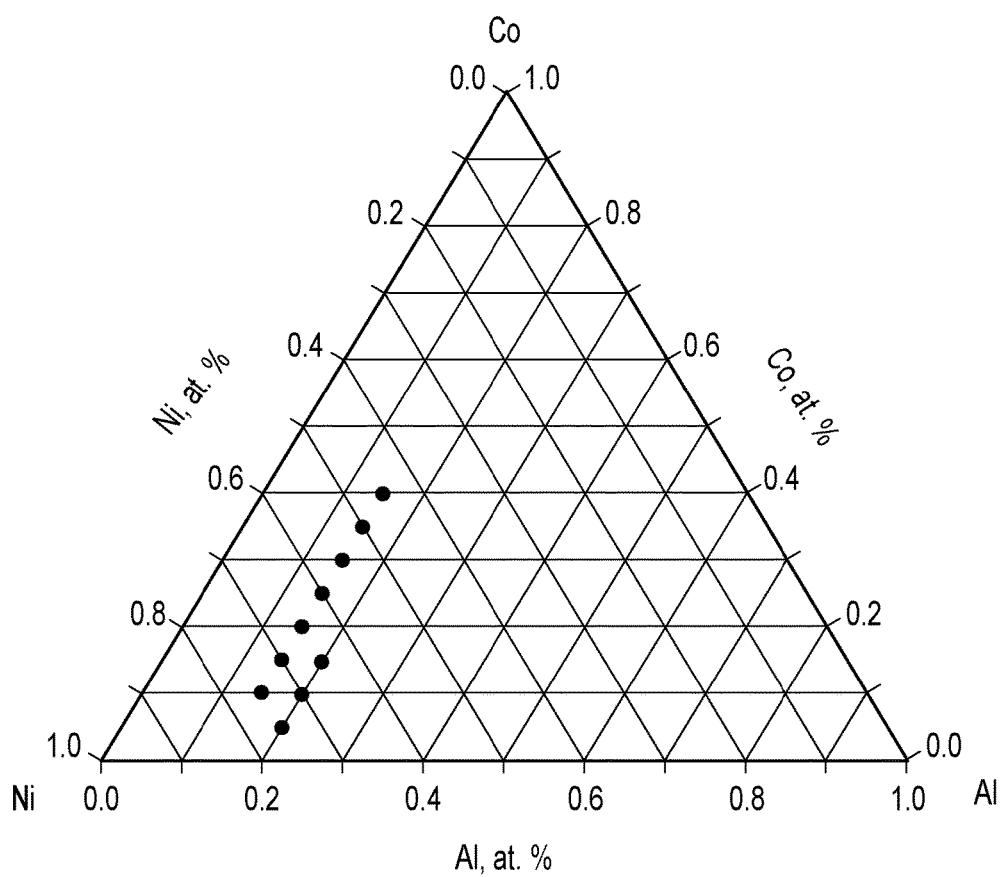
FIG. 2 is a ternary compositional diagram which displays non-limiting examples of the invention alloys in solid circles.

The new materials generally have an fcc crystalline structure and include 6.7-11.4 wt. % Al, 5.0-48.0 wt. % Co, and 43.9-88.3 wt. % Ni ("the alloying elements"), wherein the material includes a sufficient amount of the Al, Co, and Ni to realize an fcc solid solution structure. The material may consist of the Al, Co, and Ni, allowing for incidental elements and unavoidable impurities. As used herein, "incidental elements" includes grain boundary modifiers, casting aids, and/or grain structure control materials, such as carbon, boron, zirconium, hafnium, and the like, that may be used in the alloy. For instance, one or more of carbon, boron, zirconium, hafnium, and the like may be added in an amount sufficient to provide grain boundary modification. The amount added should be restricted to an amount sufficient to provide grain boundary modification without inappropriately degrading properties of the material, such as by intermetallic formation. As one non-limiting example, up to 0.15 wt. % C, up to 0.15 wt. % B, up to 0.5 wt. % Hf and up to 0.5 wt. % Zr may be added to the material, provided the amount added does not result in inappropriate degradation of material properties. Various compositional embodiments of the new materials are shown in FIG. 2, below. The solid circles are non-limiting examples of invention alloys. Table 1, below, corresponds to non-limiting examples of the types of alloys useful in accordance with the present patent application. Alloys 1-3 are Tier 1 alloys, and the remaining alloys are Tier 2 alloys.

TABLE 1

| Alloy | Al (at. %) | Co (at. %) | Ni (at. %) |
|---|---|---|---|
| 1 | 20 | 5 | 75 |
| 2 | 20 | 10 | 70 |
| 3 | 20 | 15 | 65 |
| 4 | 15 | 25 | 60 |
| 5 | 15 | 20 | 65 |
| 6 | 15 | 30 | 55 |
| 7 | 15 | 15 | 70 |
| 8 | 15 | 35 | 50 |
| 9 | 15 | 10 | 75 |
| 10 | 15 | 40 | 45 |

TABLE 2

Alloy Tier Properties

| Alloy Tier | Potential Properties of Tier |
|---|---|
| 1 | Solvus temperature of 1265-1290° C.<br>Non-equilibrium freezing range of 40-60° C.<br>Density of 7190-7200 kg/m$^3$<br>Precipitate(s) may be the L1$_2$ phase, the B2 phase, or others |
| 2 | Solvus temperature of 1000-1040° C.<br>Non-equilibrium freezing range of 75-115° C.<br>Density of 7580-7595 kg/m$^3$<br>Precipitate(s) may be the L1$_2$ phase, or others |

In one approach, the new materials include at least one precipitate phase and have a solvus temperature of at least 1000° C. In this approach, the new materials may include 6.7-11.4 wt. % Al, 5.0-48.0 wt. % Co, and 43.9-88.3 wt. % Ni. In one embodiment, the precipitate is selected from the group consisting of the L1$_2$ phase, the B2 phase, and combinations thereof. The precipitation phase(s) may be formed during solid state transformation. In one specific approach, the new materials may include 7.4-10.3 wt. % Al, 5.6-43.6 wt. % Co, and 48.8-84.1 wt. % Ni. In some of these embodiments, the non-equilibrium freezing range of the material is not greater than 300° C. In one embodiment, the non-equilibrium freezing range of the material is not greater than 250° C. In another embodiment, the non-equilibrium freezing range of the material is not greater than 200° C. In another embodiment, the non-equilibrium freezing range of the material is not greater than 150° C. In another embodiment, the non-equilibrium freezing range of the material is not greater than 125° C.

In one approach, the new materials include at least one precipitate phase and have a solvus temperature of at least 1100° C. In this approach, the new materials may include 9.2-11.4 wt. % Al, 5.0-25.3 wt. % Co, and 65.5-85.8 wt. % Ni. In one embodiment, the precipitate is selected from the group consisting of the L1$_2$ phase, the B2 phase, and combinations thereof. The precipitation phase(s) may be formed during solid state precipitation. In one specific approach, the new materials may include about 10.3 wt. % Al (±0.5 wt. %), 5.6-16.9 wt. % Co, and 72.8-84.1 wt. % Ni. In some of these embodiments, the non-equilibrium freezing range of the material is not greater than 300° C. In one embodiment, the non-equilibrium freezing range of the material is not greater than 250° C. In another embodiment, the non-equilibrium freezing range of the material is not greater than 200° C. In another embodiment, the non-equilibrium freezing range of the material is not greater than 150° C. In another embodiment, the non-equilibrium freezing range of the material is not greater than 100° C. In another embodiment, the non-equilibrium freezing range of the material is not greater than 50° C. In some of these embodiments, the new materials include at least one precipitate phase and have a solvus temperature of at least 1200° C. In some of these embodiments, the new materials include at least one precipitate phase and have a solvus temperature of at least 1300° C.

Figure 3:
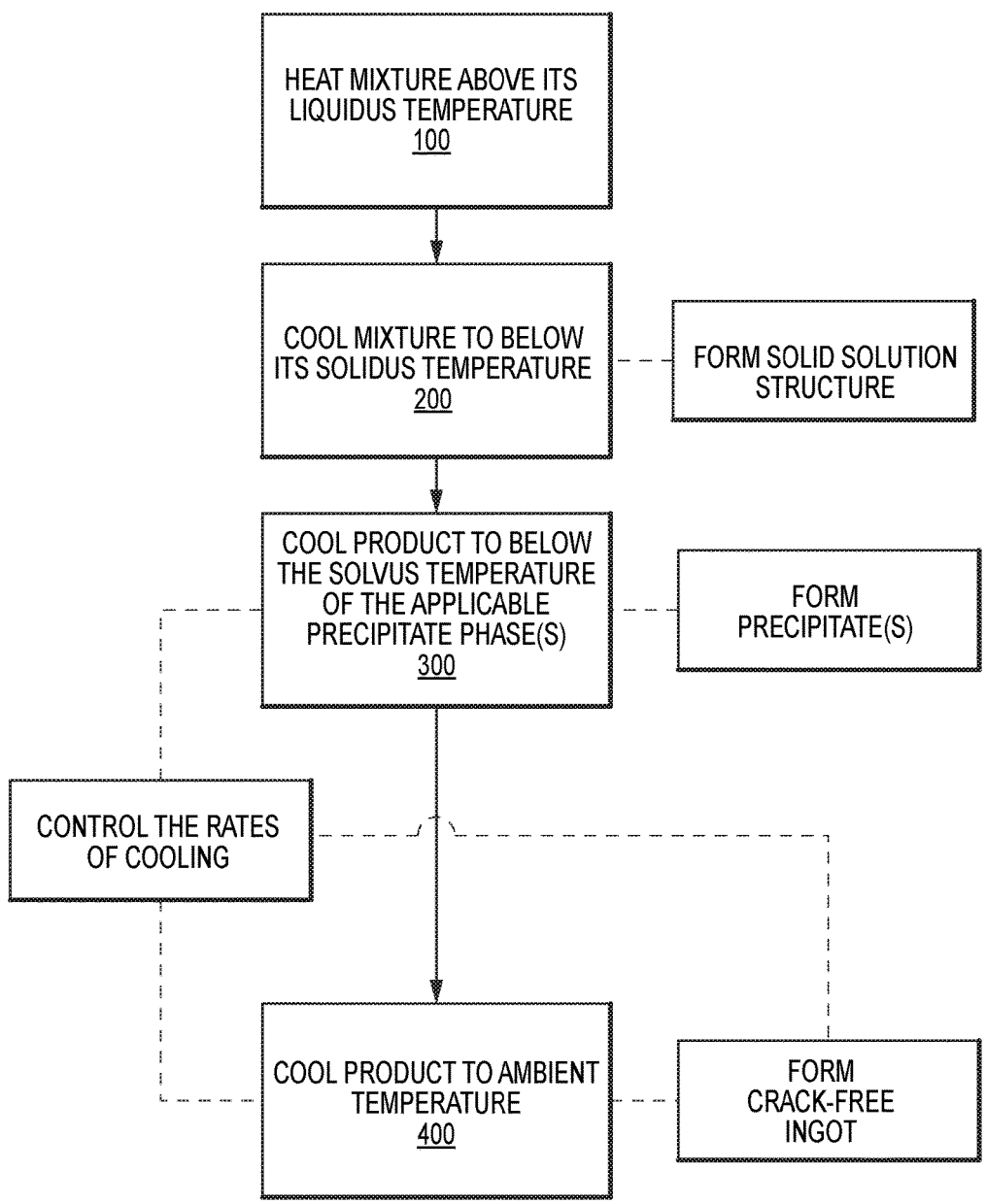
FIG. 3 is a flow chart of one embodiment of a method to produce a new material.

In one approach, and referring now to FIG. 3, a method of producing a new material includes the steps of (100) heating a mixture comprising Al, Co, and Ni, and within the scope of the compositions described above, above a liquidus temperature of the mixture, thereby forming a liquid, (200) cooling the mixture from above the liquidus temperature to below the solidus temperature, wherein, due to the cooling, the mixture forms a solid product having a fcc (face-centered cubic) solid solution structure (potentially with other phases due to microsegregation), and wherein the mixture comprises a sufficient amount of the Al, the Co, and the Ni to realize the fcc solid solution structure, and (300) cooling the solid product to below a solvus temperature of a precipitate phase of the mixture, thereby forming a precipitate phase within the fcc solid solution structure of the solid product, wherein the mixture comprises a sufficient amount of the Al, the Co, and the Ni to realize the precipitate phase within the fcc solid solution structure. In one embodiment, the fcc solid solution is the first phase to form from the liquid.

In one embodiment, controlled cooling of the material is employed to facilitate realization of an appropriate end product. For instance, a method may include the step of (400) cooling the mixture to ambient temperature, and a method may include controlling rates of cooling during at least cooling steps (300) and (400) such that, upon conclusion of step (400), i.e., upon reaching ambient temperature, a crack-free ingot is realized. Controlled cooling may be accomplished by, for instance, using an appropriate water cooled casting mold.

As used herein, "ingot" means a cast product of any shape. The term "ingot" includes billet. As used herein, "crack-free ingot" means an ingot that is sufficiently free of cracks such that it can be used as fabricating ingot. As used herein, "fabricating ingot" means an ingot suitable for subsequent working into a final product. The subsequent working may include, for instance, hot working and/or cold working via any of rolling, forging, extrusion, as well as stress relief by compression and/or stretching.

In one embodiment, a crack-free product, such as a crack-free ingot, may be processed, as appropriate, to obtain a final wrought product from the material. For instance, and referring now to FIGS. 3-4, steps (100)-(400) of FIG. 3, described above, may be considered a casting step (10), shown in FIG. 4, resulting in the above-described crack-free ingot. In other embodiments, the crack-free product may be a crack-free preform produced by, for instance, shape casting, additive manufacturing or powder metallurgy. In any event, the crack-free product may be further processed to obtain a wrought final product having the fcc solid solution structure, optionally with one or more of the precipitates phases therein. This further processing may include any combination of dissolving (20) and working (30) steps, described below, as appropriate to achieve the final product form. Once the final product form is realized, the material may be precipitation hardened (40) to develop strengthening precipitates. The final product form may be a rolled product, an extruded product or a forged product, for instance.

Figure 4:
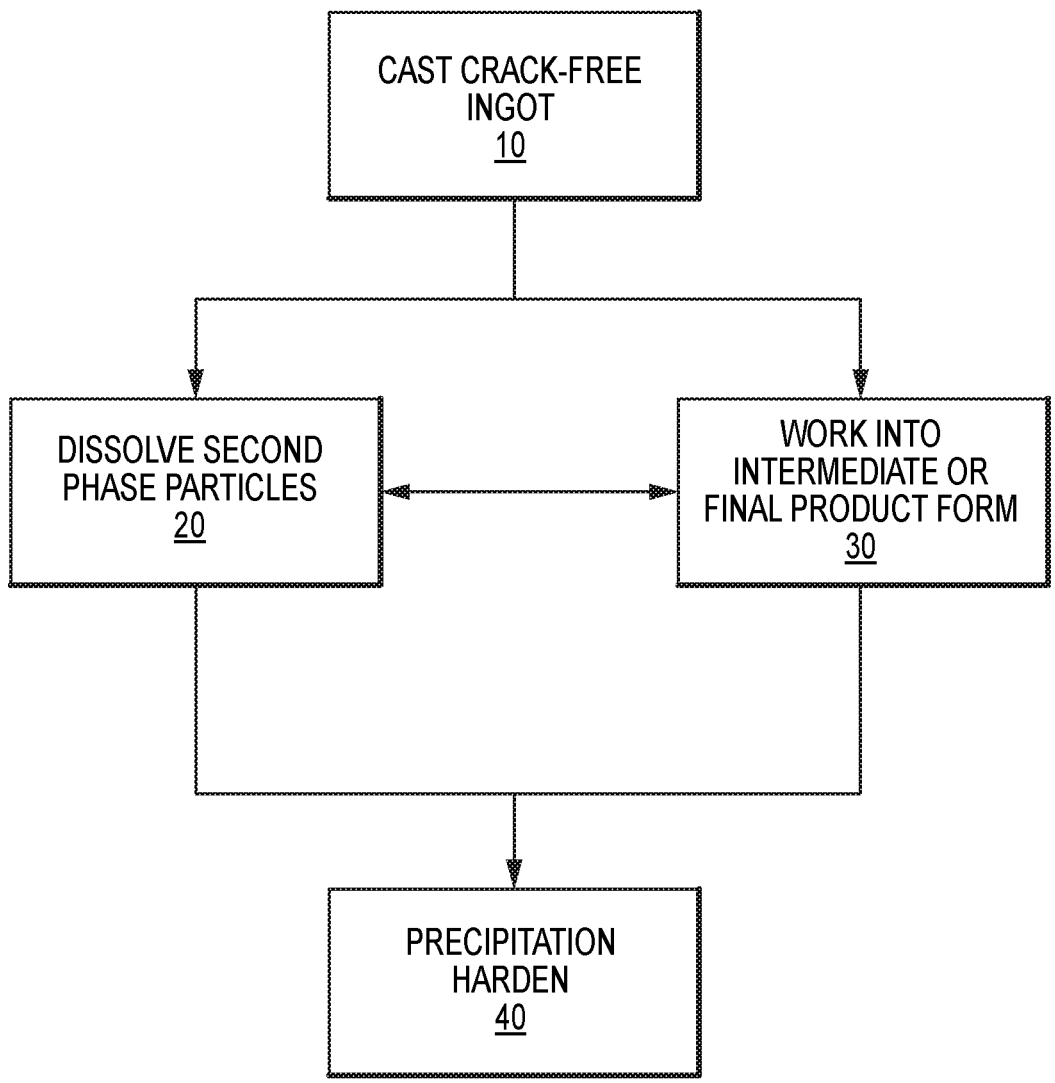
FIG. 4 is a flow chart of one embodiment of a method to obtain a wrought product having a fcc solid solution structure with one or more of the precipitates therein.

With continued reference to FIG. 4, as a result of the casting step (10), the ingot may include some second phase particles. The method may therefore include one or more dissolving steps (20), where the ingot, an intermediate product form and/or the final product form are heated above the solvus temperature of the applicable precipitate(s) but below the solidus temperature of the material, thereby dissolving some of or all of the second phase particles. The dissolving step (20) may include soaking the material for a time sufficient to dissolve the applicable second phase particles. After the soak, the material may be cooled to ambient temperature for subsequent working. Alternatively, after the soak, the material may be immediately hot worked via the working step (30).

The working step (30) generally involves hot working and/or cold working the ingot and/or an intermediate product form. The hot working and/or cold working may include rolling, extrusion or forging of the material, for instance. The working (30) may occur before and/or after any dissolving step (20). For instance, after the conclusion of a dissolving step (20), the material may be allowed to cool to ambient temperature, and then reheated to an appropriate temperature for hot working. Alternatively, the material may be cold worked at around ambient temperatures. In some embodiments, the material may be hot worked, cooled to ambient, and then cold worked. In yet other embodiments, the hot working may commence after a soak of a dissolving step (20) so that reheating of the product is not required for hot working.

The working step (30) may result in precipitation of second phase particles. In this regard, any number of post-working dissolving steps (20) can be utilized, as appropriate, to dissolve some of or all of the second phase particles that may have formed due to the working step (30).

After any appropriate dissolving (20) and working (30) steps, the final product form may be precipitation hardened (40). The precipitation hardening (40) may include heating the final product form to above the applicable precipitate(s) solvus temperature for a time sufficient to dissolve at least some second phase particles precipitated due to the working, and then rapidly cooling the final product form to below the applicable precipitate(s) solvus temperature thereby forming precipitate particles. The precipitation hardening (40) will further include holding the product at the target temperature for a time sufficient to form strengthening precipitates, and then cooling the product to ambient temperature, thereby realizing a final aged product having strengthening precipitates therein. In one embodiment, the final aged product contains ≥0.5 vol. % of the strengthening precipitates. The strengthening precipitates are preferably located within the matrix of the fcc solid solution structure, thereby conferring strength to the product through interactions with dislocations.

Due to the structure and composition of the new materials, the new materials may realize an improved combination of properties, such as an improved combination of at least two of density, ductility, strength, fracture toughness, oxidation resistance, fatigue resistance, creep resistance, and elevated temperature resistance, among others. Thus, the new materials may find use in various applications, such as use in high temperature applications employed in the automotive (passenger vehicles, truck, and any other land-based vehicles) and aerospace industries, to name a few. For instance, the new materials may find applicability as turbine components in engines or other high temperature applications. Other components include blades, disks, vanes, rings and casings for engines. In one embodiment, the new material is employed in an application requiring operation at a temperature of from 600° C. to 1000° C., or higher.

The new fcc materials described above can also be used to produce shape cast products or preforms. Shape cast products are those products that achieve their final or near final product form after the casting process. The new materials may be shape cast into any desired shape. In one embodiment, the new materials are shape cast into an automotive or aerospace component (e.g., shape cast into an engine component). After casting, the shape cast product may be subject to any appropriate dissolving (20) or precipitation hardening (40) steps, as described above. In one embodiment, a shape cast product consists essentially of the Al, the Co, and the Ni, and within the scope of the compositions described above. In one embodiment, the shape cast product includes ≥0.5 vol. % of strengthening precipitates.

While this patent application has generally been described as relating to fcc matrix alloy materials having one or more of the above enumerated precipitate phase(s) therein, it is to be appreciated that other hardening phases may be applicable to the new fcc matrix alloy materials, and all such hardening phases (coherent or incoherent) may find utility in the fcc alloy materials described herein.

Additive Manufacturing of New fcc Materials

It is also possible to manufacture the new materials described above by additive manufacturing. As used herein, "additive manufacturing" means, "a process of joining materials to make objects from 3D model data, usually layer upon layer, as opposed to subtractive manufacturing methodologies", as defined in ASTM F2792-12a entitled "Standard Terminology for Additively Manufacturing Technologies". The new materials may be manufactured via any appropriate additive manufacturing technique described in this ASTM standard, such as binder jetting, directed energy deposition, material extrusion, material jetting, powder bed fusion, or sheet lamination, among others.

In one embodiment, an additive manufacturing process includes depositing successive layers of one or more powders and then selectively melting and/or sintering the powders to create, layer-by-layer, an additively manufactured body (product). In one embodiment, an additive manufacturing processes uses one or more of Selective Laser Sintering (SLS), Selective Laser Melting (SLM), and Electron Beam Melting (EBM), among others. In one embodiment, an additive manufacturing process uses an EOSINT M 280 Direct Metal Laser Sintering (DMLS) additive manufacturing system, or comparable system, available from EOS GmbH (Robert-Stirling-Ring 1, 82152 Krailling/Munich, Germany).

As one example a feedstock, such as a powder or wire, comprising (or consisting essentially of) the alloying elements and any optional incidental elements, and within the scope of the compositions described above, may be used in an additive manufacturing apparatus to produce an additively manufactured body comprising a fcc solid solution structure, optionally with precipitate phase(s) therein. In some embodiments, the additively manufactured body is a crack-free preform. The powders may be selectively heated above the liquidus temperature of the material, thereby forming a molten pool having the alloying elements and any optional incidental elements, followed by rapid solidification of the molten pool.

As noted above, additive manufacturing may be used to create, layer-by-layer, a metal product (e.g., an alloy product), such as via a metal powder bed. In one embodiment, a metal powder bed is used to create a product (e.g., a tailored alloy product). As used herein a "metal powder bed" and the like means a bed comprising a metal powder. During additive manufacturing, particles of the same or different compositions may melt (e.g., rapidly melt) and then solidify (e.g., in the absence of homogenous mixing). Thus, products having a homogenous or non-homogeneous microstructure may be produced. One embodiment of a method of making an additively manufactured body may include (a) dispersing a powder comprising the alloying elements and any optional incidental elements, (b) selectively heating a portion of the powder (e.g., via a laser) to a temperature above the liquidus temperature of the particular body to be formed, (c) forming a molten pool having the alloying elements and any optional incidental elements, and (d) cooling the molten pool at a cooling rate of at least 1000° C. per second. In one embodiment, the cooling rate is at least 10,000° C. per second. In another embodiment, the cooling rate is at least 100,000° C.

per second. In another embodiment, the cooling rate is at least 1,000,000° C. per second. Steps (a)-(d) may be repeated as necessary until the body is completed, i.e., until the final additively manufactured body is formed/completed. The final additively manufactured body comprising the fcc solid solution structure, optionally with the precipitate phase(s) therein, may be of a complex geometry, or may be of a simple geometry (e.g., in the form of a sheet or plate). After or during production, an additively manufactured product may be deformed (e.g., by one or more of rolling, extruding, forging, stretching, compressing).

The powders used to additively manufacture a new material may be produced by atomizing a material (e.g., an ingot or melt) of the new material into powders of the appropriate dimensions relative to the additive manufacturing process to be used. As used herein, "powder" means a material comprising a plurality of particles. Powders may be used in a powder bed to produce a tailored alloy product via additive manufacturing. In one embodiment, the same general powder is used throughout the additive manufacturing process to produce a metal product. For instance, the final tailored metal product may comprise a single region/matrix produced by using generally the same metal powder during the additive manufacturing process. The final tailored metal product may alternatively comprise at least two separately produced distinct regions. In one embodiment, different metal powder bed types may be used to produce a metal product. For instance, a first metal powder bed may comprise a first metal powder and a second metal powder bed may comprise a second metal powder, different than the first metal powder. The first metal powder bed may be used to produce a first layer or portion of the alloy product, and the second metal powder bed may be used to produce a second layer or portion of the alloy product. As used herein, a "particle" means a minute fragment of matter having a size suitable for use in the powder of the powder bed (e.g., a size of from 5 microns to 100 microns). Particles may be produced, for example, via atomization.

The additively manufactured body may be subject to any appropriate dissolving (20), working (30) and/or precipitation hardening steps (40), as described above. If employed, the dissolving (20) and/or the working (30) steps may be conducted on an intermediate form of the additively manufactured body and/or may be conducted on a final form of the additively manufactured body. If employed, the precipitation hardening step (40) is generally conducted relative to the final form of the additively manufactured body. In one embodiment, an additively manufactured body consists essentially of the alloying elements and any incidental elements and impurities, such as any of the material compositions described above, optionally with ≥0.5 vol. % of precipitate phase(s) therein.

In another embodiment, the new material is a preform for subsequent working. A preform may be an ingot, a shape casting, an additively manufactured product, or a powder metallurgy product. In one embodiment, a preform is of a shape that is close to the final desired shape of the final product, but the preform is designed to allow for subsequent working to achieve the final product shape. Thus, the preform may worked (30) such as by forging, rolling, or extrusion to produce an intermediate product or a final product, which intermediate or final product may be subject to any further appropriate dissolving (20), working (30) and/or precipitation hardening steps (40), as described above, to achieve the final product. In one embodiment, the working comprises hot isostatic pressing (hipping) to compress the part. In one embodiment, an alloy preform may be compressed and porosity may be reduced. In one embodiment, the hipping temperature is maintained below the incipient melting point of the alloy preform. In one embodiment, the preform may be a near net shape product.

In one approach, electron beam (EB) or plasma arc techniques are utilized to produce at least a portion of the additively manufactured body. Electron beam techniques may facilitate production of larger parts than readily produced via laser additive manufacturing techniques. In one embodiment, a method comprises feeding a small diameter wire (e.g., ≤2.54 mm in diameter) to the wire feeder portion of an electron beam gun. The wire may be of the compositions, described above. The electron beam (EB) heats the wire above the liquidus point of the body to be formed, followed by rapid solidification (e.g., at least 100° C. per second) of the molten pool to form the deposited material. The wire could be fabricated by a conventional ingot process or by a powder consolidation process. These steps may be repeated as necessary until the final product is produced. Plasma arc wire feed may similarly be used with the alloys disclosed herein. In one embodiment, not illustrated, an electron beam (EB) or plasma arc additive manufacturing apparatus may employ multiple different wires with corresponding multiple different radiation sources, each of the wires and sources being fed and activated, as appropriate to provide the product having a metal matrix having the alloying elements and any optional incidental elements.

In another approach, a method may comprise (a) selectively spraying one or more metal powders towards or on a building substrate, (b) heating, via a radiation source, the metal powders, and optionally the building substrate, above the liquidus temperature of the product to be formed, thereby forming a molten pool, (c) cooling the molten pool, thereby forming a solid portion of the metal product, wherein the cooling comprises cooling at a cooling rate of at least 100° C. per second. In one embodiment, the cooling rate is at least 1000° C. per second. In another embodiment, the cooling rate is at least 10,000° C. per second. The cooling step (c) may be accomplished by moving the radiation source away from the molten pool and/or by moving the building substrate having the molten pool away from the radiation source. Steps (a)-(c) may be repeated as necessary until the metal product is completed. The spraying step (a) may be accomplished via one or more nozzles, and the composition of the metal powders can be varied, as appropriate, to provide tailored final metal products having a metal matrix, the metal matrix having the alloying elements and any optional incidental elements. The composition of the metal powder being heated at any one time can be varied in real-time by using different powders in different nozzles and/or by varying the powder composition(s) provided to any one nozzle in real-time. The work piece can be any suitable substrate. In one embodiment, the building substrate is, itself, a metal product (e.g., an alloy product.)

As noted above, welding may be used to produce metal products (e.g., to produce alloy products). In one embodiment, the product is produced by a melting operation applied to pre-cursor materials in the form of a plurality of metal components of different composition. The pre-cursor materials may be presented in juxtaposition relative to one another to allow simultaneous melting and mixing. In one example, the melting occurs in the course of electric arc welding. In another example, the melting may be conducted by a laser or an electron beam during additive manufacturing. The melting operation results in the plurality of metal components mixing in a molten state and forming the metal product, such as in the form of an alloy. The pre-cursor materials may be provided in the form of a plurality of physically separate forms, such as a plurality of elongated strands or fibers of metals or metal alloys of different composition or an elongated strand or a tube of a first composition and an adjacent powder of a second composition, e.g., contained within the tube or a strand having one or more clad layers. The pre-cursor materials may be formed into a structure, e.g., a twisted or braided cable or wire having multiple strands or fibers or a tube with an outer shell and a powder contained in the lumen thereof. The structure may then be handled to subject a portion thereof, e.g., a tip, to the melting operation, e.g., by using it as a welding electrode or as a feed stock for additive manufacturing. When so used, the structure and its component pre-cursor materials may be melted, e.g., in a continuous or discrete process to form a weld bead or a line or dots of material deposited for additive manufacture.

In one embodiment, the metal product is a weld body or filler interposed between and joined to a material or material to the welded, e.g., two bodies of the same or different material or a body of a single material with an aperture that the filler at least partially fills. In another embodiment, the filler exhibits a transition zone of changing composition relative to the material to which it is welded, such that the resultant combination could be considered the alloy product.

New fcc Materials Consisting Essentially of a fcc Solid Solution Structure

While the above disclosure generally describes how to produce new fcc materials having precipitate phase(s) therein, it is also possible to produce a material consisting essentially of a fcc solid solution structure. For instance, after production of an ingot, a wrought body, a shape casting, or an additively manufactured body, as described above, the material may be homogenized, such as in a manner described relative to the dissolving step (20), above. With appropriate rapid cooling, precipitation of any second phase particles may be inhibited/restricted, thereby realizing a fcc solid solution material essentially free of any second phase particles, i.e., a material consisting essentially of a fcc solid solution structure.

While various embodiments of the new technology described herein have been described in detail, it is apparent that modifications and adaptations of those embodiments will occur to those skilled in the art. However, it is to be expressly understood that such modifications and adaptations are within the spirit and scope of the presently disclosed technology.

The invention claimed is:

1. A method comprising:
    (a) using a feedstock in an additive manufacturing apparatus, wherein the feedstock comprises:
        6.7-11.4 wt. % Al;
        5.0-48.0 wt. % Co; and
        43.9-88.3 wt. % Ni;
    (b) producing a metal product in the additive manufacturing apparatus using the feedstock.

2. The method of claim 1, wherein the feedstock comprises a powder feedstock, wherein the method comprises:
    (a) dispersing a metal powder of the powder feedstock in a bed and/or spraying a metal powder of the powder feedstock towards or on a substrate;
    (b) selectively heating a portion of the metal powder above its liquidus temperature, thereby forming a molten pool;
    (c) cooling the molten pool, thereby forming a portion of the metal product, wherein the cooling comprises cooling at a cooling rate of at least 100° C. per second; and
    (d) repeating steps (a)-(c) until the metal product is completed, wherein the metal product comprises a metal matrix, wherein the Al, Co, and Ni make-up the matrix.

3. The method of claim 1, wherein the feedstock comprises a wire feedstock, wherein the method comprises:
    (a) using a radiation source to heat the wire feedstock above its liquidus point, thereby creating a molten pool, wherein the molten pool comprises Al, Co, and Ni;
    (b) cooling the molten pool at a cooling rate of at least 1000° C. per second; and
    (c) repeating steps (a)-(b) until the metal product is completed, wherein the metal product comprises a metal matrix, wherein the Al, Co, and Ti make-up the matrix.

4. The method of claim 1, comprising: cooling at a rate sufficient to form at least one precipitate phase.

5. The method of claim 4, wherein the at least one precipitate phase comprises at least one of $L1_0$ and $Al_2Zr$.

6. The method of claim 5, wherein the metal product comprises at least 0.5 vol. % of the precipitate phase.

7. The method of claim 1, comprising:
    working the metal product.

8. The method of claim 7, wherein the metal product is a final additively manufactured body and wherein the working is working of the final additively manufactured body.

9. The method of claim 7, wherein the producing step comprises:
    first producing a portion of the metal product using the feedstock;
    second producing another portion of the metal product using the feedstock;
    wherein the working occurs at least after the first or second producing steps.

10. The method of claim 9, wherein the working occurs between the first producing step and the second producing step.

11. The method of claim 9, wherein the working comprises hot isostatic pressing.

12. The method of claim 9, wherein the working comprises one or more of rolling, forging, and extrusion.

13. The method of claim 1, wherein the feedstock comprises at least 32.7 wt. % Co.

14. The method of claim 1, wherein the feedstock comprises at least 38.2 wt. % Co.

15. The method of claim 1, wherein the feedstock comprises not greater than 43.6 wt. % Co.

* * * * *